No. 823,415. PATENTED JUNE 12, 1906.
R. A. W. KRAMPITZ.
COOKING UTENSIL.
APPLICATION FILED APR. 17, 1905.
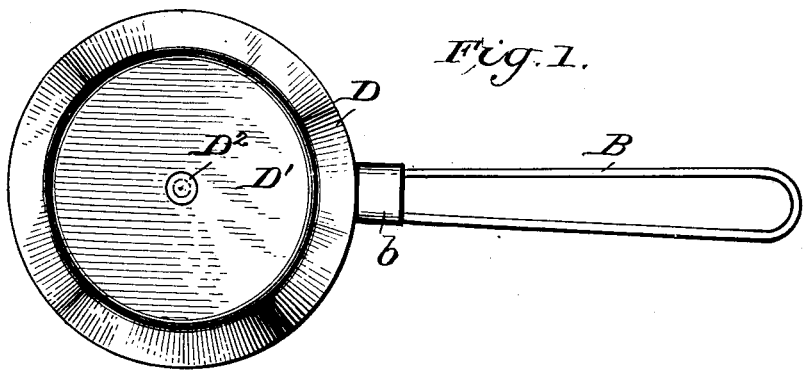
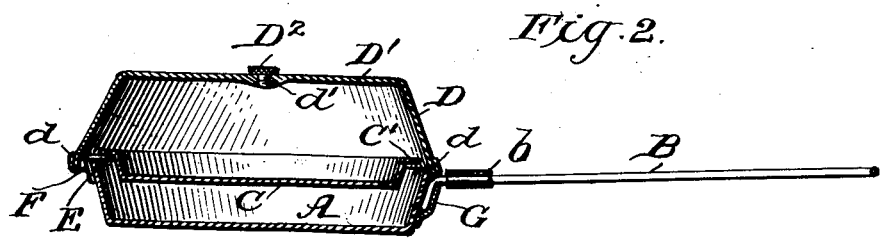
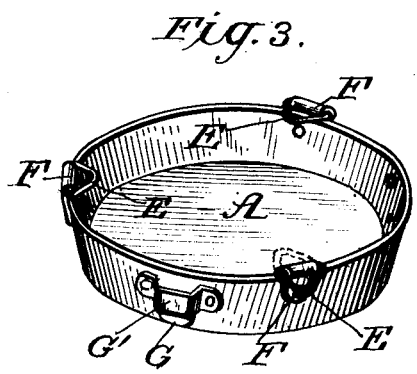
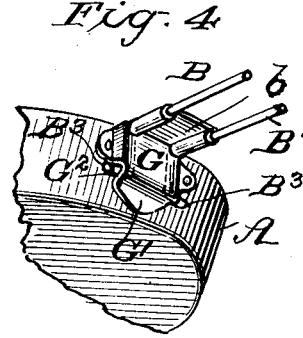
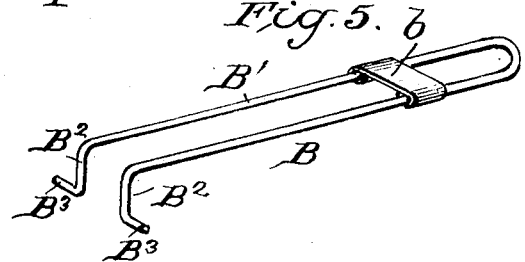
WITNESSES:
Jos. A. Ryan
Perry B. Turpin
INVENTOR
ROBERT A. W. KRAMPITZ
BY Munn & Co.
ATTORNEYS

UNITED STATES PATENT OFFICE.

ROBERT A. W. KRAMPITZ, OF VALDEZ, DISTRICT OF ALASKA.

COOKING UTENSIL.

No. 823,415.　　　Specification of Letters Patent.　　　Patented June 12, 1906.

Application filed April 17, 1905. Serial No. 255,955.

*To all whom it may concern:*

Be it known that I, ROBERT A. W. KRAMPITZ, a citizen of the United States, and a resident of the city of Valdez, District of Alaska, have invented a new and useful Improvement in Culinary Utensils, of which the following is a specification.

My invention is an improvement in culinary utensils especially designed for use in camping-outfits and the like, but which may be employed whenever desired; and the invention consists in certain novel constructions and combinations of parts, as will be hereinafter described and claimed.

In the drawings, Figure 1 is a top plan view, and Fig. 2 is a vertical longitudinal section, of a utensil embodying my invention. Fig. 3 is a detail perspective view of the frying-pan. Fig. 4 is a detail perspective view of a portion of such pan, showing the device for connecting the handle with such pan. Fig. 5 is a detail perspective view of the handle detached.

As shown, the utensil comprises what for convenience of reference I term a frying-pan A, a detachable handle B, a bread-pan C, and a cover D. These parts are removable, as shown in Figs. 1 and 2, for baking or other similar purposes. The pan A is provided with pivoted bails E, which are provided at one edge with cross-bars journaling in loops F, secured on the outer sides of the pan, so that the bails E when turned inwardly, as shown in Figs. 2 and 3, will rest upon the upper edge of the pan A and be held in horizontal position, as best shown in Fig. 2, in order to secure and support the bread-pan C, which latter is provided with outwardly-projecting flanges C' to rest upon the bails E in the arrangement of parts shown in Fig. 2. This construction and arrangement of the loops F also permits the said loops to be turned down against the outer side of the frying-pan out of the way when it is desired to use such pan simply for frying purposes.

On the outer side of the pan A, I secure a keeper G, open at its upper side, closed at its lower side G', and provided near said lower side with lateral openings G², through which project lateral studs or ends of the handle B when such handle is connected with the pan, as shown in Figs. 2 and 4 of the drawings. The handle B has its side bars B' provided with depending arms B² and the laterally-projecting studs or portions B³, which latter may be pressed toward each other in inserting the handle into the keeper G and then permitted to spring outwardly through the openings G² and be locked in such adjustment by moving the slide $b$ downwardly from the position shown in Fig. 3 to that shown in Figs. 2 and 4 of the drawings. When so adjusted, the slide $b$ locks the detachable handle in engagement with the keeper and in connection with the pan, as desired. At the same time the handle may be readily released by moving the slide back to the position shown in Fig. 5 and then compressing the free ends of the handle to disengage it from the keeper.

The cover-pan D has its edges turned at $d$ and is adapted at such edge to fit over the upper open end of the pan A and form an oven-like inclosure over the pan C for baking purposes. It is desirable to open the pan D at its top when the latter is arranged, as shown in Fig. 2, for use as a cover-pan, and I therefore provide such pan in its plate $d'$ with an opening D², which may be applied as shown in Fig. 2 when the pan is to be used for making up bread or for other mixing purposes and can be removed whenever desired. It may be desirable in some instances to close the opening $d'$ when the cover-pan D is adjusted, as shown in Fig. 2, and the plug $d^2$ may be quickly applied and removed whenever desired. It will thus be noticed that the utensil comprises three different camp utensils—one a mixing-pan for mixing bread, &c., a bread-pan in which biscuits and other bread may be baked, and a frying-pan which may coöperate with said mixing-pan and bread-pan when arranged as shown in Fig. 2, and which is provided with a detachable handle, which can be quickly applied and readily removed and will avoid the difficulties resulting from a fixed handle on the frying-pan, such as the heating of the handle to a high degree and the breaking of the handle, as is commonly experienced, especially in the treatment utensils receive in camping.

The different parts of my utensil may be made of suitable metal and may be finished in any desired way, and when not in use the pans A, C, and D may be nested together and the handle be detached.

It will be noticed that the cover-pan when arranged as shown in Fig. 2 projects over the hinged loops F, and an opening is provided between the frying-pan and such cover through which air may circulate.

Having thus described my invention, what I claim as new, and desire to secure by Letters Patent, is—

1. The cooking utensil herein described, comprising the pan provided on its outer side with the keeper having near its lower end the lateral openings or seats for the lateral studs of the detachable handle, the detachable handle having its side bars provided near their free ends with depending arms fitting on the keeper and with lateral studs or projections engaging with such keeper, the slide movable along the side bars of the detachable handle, the bails, the loops F arranged at the outer side of the frying-pan, the bails journaling in the said loops and resting when turned inward upon the upper edge of the frying-pan, the bread-pan having downturned flanges resting on said bails, and the cover-pan fitting over the bread-pan and the frying-pan and having an opening in its bottom, and the plug, for closing the same, substantially as set forth.

2. The combination with the frying-pan of the bails journaled at one edge in connection with the pan, and adapted to turn inwardly to support the bread-pan and to turn downwardly out of the way when desired, substantially as set forth.

3. The combination with a frying-pan having an upright keeper G closed at its bottom and provided with lateral openings adjacent to said bottom, of the handle having its side bars provided near their free ends with depending arms to fit within the keeper and at the extremities of said arms with the lateral studs or projections to pass through the lateral openings in the keeper, substantially as set forth.

4. A pan provided with a keeper having its opposite side plates provided with seats for engagement by handle-studs, and a handle having arms provided with portions entering the keeper and with lateral studs springing into and out of engagement with the seats in the opposite sides of the keeper, substantially as set forth.

5. The combination with the pan, of the keeper G having lateral openings $G^2$ and the handle having its side bars provided with depending arms fitting in the keeper and with lateral studs or projections entering the openings $G^2$, substantially as set forth.

6. The combination in a cooking utensil of the frying-pan, the bails pivoted thereto and adapted to be turned inward to support the bread-pan, the bread-pan resting on such bails, and the cover, substantially as set forth.

ROBERT A. W. KRAMPITZ.

Witnesses:
J. W. LEEDY,
A. M. LEEDY.